United States Patent
Salemizadeh et al.

(10) Patent No.: US 10,814,354 B1
(45) Date of Patent: Oct. 27, 2020

(54) COMPUTERIZED SYSTEM, METHOD AND PROCESSOR-EXECUTABLE CODE TO AUTONOMOUSLY SCREEN MAILABLE ITEMS TO IDENTIFY CANDIDATE ITEMS FOR CONTENT INSPECTION OR TESTING

(71) Applicant: Siemens Logistics LLC, DFW Airport, TX (US)

(72) Inventors: Abdul Hamid Salemizadeh, Burleson, TX (US); John M. Zatopek, Arlington, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 36 days.

(21) Appl. No.: 16/400,621

(22) Filed: May 1, 2019

(51) Int. Cl.
| | |
|---|---|
| G06K 9/00 | (2006.01) |
| B07C 7/00 | (2006.01) |
| B07C 3/14 | (2006.01) |
| G06K 9/18 | (2006.01) |
| G01N 1/02 | (2006.01) |

(52) U.S. Cl.
CPC ............... B07C 3/14 (2013.01); G01N 1/02 (2013.01); G06K 9/18 (2013.01); *G01N 2001/025* (2013.01)

(58) Field of Classification Search
USPC ........ 382/100–103, 106–107, 112–114, 137, 382/140–141, 143, 155–158, 162, 168, 382/173, 181, 199, 209, 224, 254, 276, 382/285–291, 305, 312; 209/586, 630; 73/28.01
See application file for complete search history.

(56) References Cited

U.S. PATENT DOCUMENTS

| | | | |
|---|---|---|---|
| 6,521,854 B2* | 2/2003 | Tanimoto ................ | B07C 1/00 209/586 |
| 7,809,158 B2* | 10/2010 | Carpenter ............... | G06K 9/20 382/101 |
| 8,047,053 B2* | 11/2011 | Call ...................... | G01N 1/405 73/28.01 |
| 10,026,008 B2 | 7/2018 | Simgi | |
| 2005/0259847 A1 | 11/2005 | Genc et al. | |
| 2014/0351073 A1 | 11/2014 | Murphy et al. | |

(Continued)

OTHER PUBLICATIONS

Christodoulou, Lakis, "3D Computer Stereo Vision Research & Development Innovation", Electrical & Computer Engineering & Computer Science (E&CE&CS), Cyprus University of Technology, Oct. 30, 2013, 73 pages.

(Continued)

*Primary Examiner* — Seyed H Azarian

(57) ABSTRACT

Computerized system, method, and processor-executable code, as may be executed by an artificial intelligence-based system, for carrying out an autonomous process are provided. Disclosed embodiments may be used to autonomously screen in real-time mailable or shippable items being conveyed through an item processing system to identify item candidates for content inspection and/or testing to check for prohibited and/or restricted content (e.g., contraband) prior to item sortation and distribution for delivery to recipients. Disclosed embodiments make effective use of algorithms involving machine vision, machine learning, and data-intensive and/or sensor-driven tasks.

17 Claims, 4 Drawing Sheets

(56) References Cited

U.S. PATENT DOCUMENTS

2019/0108396 A1* 4/2019 Dal Mutto .............. G06T 7/174
2019/0378205 A1* 12/2019 Glaser .................. G06Q 20/203

OTHER PUBLICATIONS

Jaccard, N. et al., "Automated detection of smuggled high-risk security threats using Deep Learning", Imaging for Crime Detection and Prevention Conference, IET Digital Library, Sep. 9, 2016, 8 pages.
U.S. Department of Homeland Security, "Hazardous Information Training Sheet", National Protection and Programs Directorate Federal Protective Service, 1 Page, No Date Listed.

* cited by examiner

COMPUTERIZED SYSTEM, METHOD AND PROCESSOR-EXECUTABLE CODE TO AUTONOMOUSLY SCREEN MAILABLE ITEMS TO IDENTIFY CANDIDATE ITEMS FOR CONTENT INSPECTION OR TESTING

BACKGROUND

1. Field

Disclosed embodiments relate generally to the field of automation, and, more particularly, to system, method, and processor-executable code (e.g., algorithms), as may be executed by an artificial intelligence-based system, for carrying out an autonomous process, and, even more particularly, to computerized system, method, and processor-executable code effective for autonomously screening in real-time mailable or shippable items being conveyed through an item processing system to identify candidate items for content inspection and/or testing.

2. Description of the Related Art

Entities, such as government agencies, e.g., the United States Postal Service, or private business enterprises, e.g., Federal Express (Fed-Ex), United Parcel Services (UPS), etc., involved in delivery services of mailable or shippable items may handle hundreds of thousands of items shipped every day from multitudes of departure locations to hubs, and then redistributed to destination locations to be eventually delivered to thousands or more of recipients.

Often, a substantial amount of burdensome and time-consuming manual labor may be expended by highly trained resources to attempt to identify, such as during a screening of incoming items, suspicious items that may be candidates for content inspection and/or testing to, for example, check for prohibited and/or restricted content prior to item sortation and distribution for delivery to recipients.

Some entities may utilize various modalities of high-tech equipment (e.g., fast X-ray security screening, three-dimensional (3-D) X-ray imaging, and trace chemical detection and testing) to perform actual inspection and/or testing of selected items. Trained canines may also be utilized in certain facilities. However, regardless of the specific inspection modality, it would be prohibitively costly to install, for example, in a facility processing on a daily basis a large volume of items, enough high-tech test equipment along with the necessary number of support staff to inspect or test a relatively large percentage of the total volume of items processed by such a facility. See U.S. Pat. No. 8,047,053, for one example of mail parcel screening using multiple detection technologies.

BRIEF DESCRIPTION

A disclosed embodiment is directed to a computerized system, as may involve an artificial intelligence-based system configured to autonomously screen in real-time each respective item of a stream of mailable or shippable items being conveyed through an item processing system. The artificial intelligence-based system may be operatively coupled to acquire data indicative of physical characteristics and digital information in connection with each respective item of the stream of mailable or shippable items being conveyed through the item processing system. The artificial intelligence-based system may be further configured to process the data indicative of the physical characteristics and the digital information in connection with each respective item to form a respective virtual model of each respective item and generate a unique feature set for each respective item based on the respective virtual model of each respective item. The artificial intelligence-based system may be configured to comparatively analyze the unique feature set of each respective item with respect to reference feature sets. Based on estimation of a match or near match of the unique feature set of a respective item of the stream of mailable or shippable items with at least one of the reference feature sets, the artificial intelligence-based system may be configured to identify the respective item of the stream of mailable or shippable items as a candidate for content inspection and/or testing. The artificial intelligence-based system may be configured to command the item processing system to divert the respective identified item of the stream of mailable or shippable items for content inspection and/or testing.

A further disclosed embodiment is directed to a non-transitory computer readable medium encoded with processor-executable code that, when executed by at least one processor, causes the at least one processor to autonomously screen in real-time each respective item of a stream of mailable or shippable items being conveyed through an item processing system. The executable code may include the following: A routine to acquire data indicative of physical characteristics and digital information in connection with each respective item of the stream of mailable or shippable items being conveyed through the item processing system. A routine to process the data indicative of the physical characteristics and the digital information in connection with each respective item to form a respective virtual model of each respective item. A routine to generate a unique feature set for each respective item based on the respective virtual model of each respective item. A routine to comparatively analyze the unique feature set of each respective item with respect to reference feature sets. A routine to estimate a match or near match of at least some of elements of the unique feature set of a respective item of the stream of mailable or shippable items with corresponding elements of at least one of the reference feature sets. In response to the match or near match, a routine to identify the respective item of the stream of mailable or shippable items as a candidate for content inspection and/or testing; and a routine to command the item processing system to divert the respective identified item of the stream of mailable or shippable items for content inspection and/or testing.

Still a further disclosed embodiment is directed to a computerized method effective for performing the following: Acquiring data indicative of physical characteristics and digital information in connection with each respective item of a stream of mailable or shippable items being conveyed through an item processing system. Processing, by an artificial intelligence-based system, the data indicative of the physical characteristics and the digital information in connection with each respective item to form a respective virtual model of each respective item. Generating, by the artificial intelligence-based system, a unique feature set for each respective item based on the respective virtual model of each respective item. Comparatively analyzing, by the artificial intelligence-based system, the unique feature set of each respective item with respect to reference feature sets. In response to estimating a match or near match by the artificial intelligence-based system of the unique feature set of a respective item of the stream of mailable or shippable items with at least one of the reference feature sets, identifying the respective item of the stream of mailable or shippable items as a candidate for content inspection and/or testing. Commanding the item processing system to divert the respective identified item of the stream of mailable or shippable items for content inspection and/or testing; and generating, by a machine-learning subsystem, the reference feature sets and respective match confidence thresholds for each reference feature set. The generating by the machine-learning subsystem of at least some of the reference feature sets and respective match confidence thresholds of the at least some of the reference feature sets may be in response to a training dataset configured to define constituent elements and respective relevance values of the defined constituent elements of the at least some of the reference feature sets. The defined constituent elements and the respective relevance values of each reference feature set being configured to predict items, which are candidates for content inspection and/or testing.

DETAILED DESCRIPTION

Figure 1:
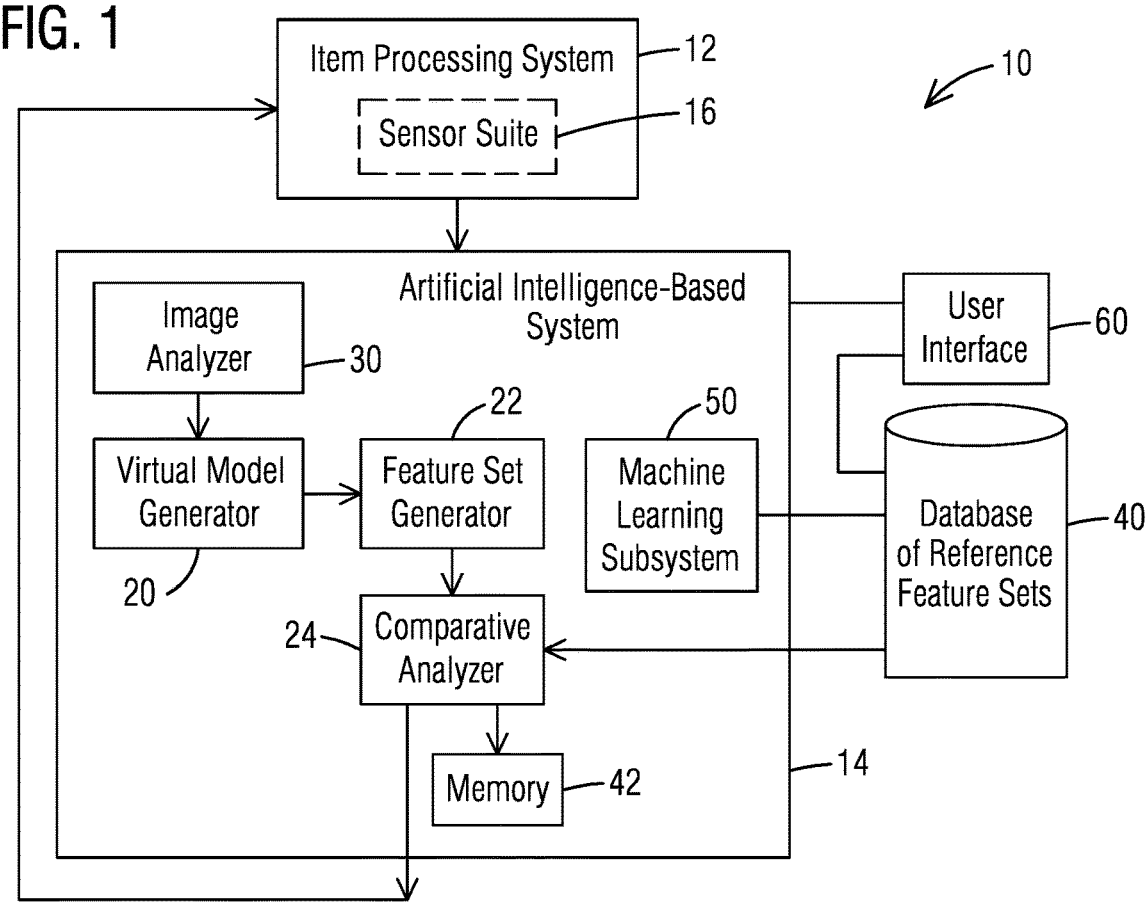
FIG. 1 illustrates a schematic diagram of one non-limiting embodiment of a disclosed computerized system, as may be used to autonomously screen in real-time each respective item of a stream of mailable or shippable items being conveyed through an item processing system.

The present inventors have recognized that—at least in part because eCommerce has led to an exponential growth of online retail, where, presently by way of the Internet, it is relatively easy to find and purchase items from virtually anywhere in the world—for many entities involved in delivery services of mailable or shippable items, such as without limitation, envelopes, parcels, mailing tubes, cargo containers, etc., the sheer volume of incoming items can pose substantial burdens to appropriately process and clear such items for delivery.

This sheer volume of items has typically just allowed such entities to carry out content inspection or testing of no more than a relatively small percentage of the total volume of items being processed in any given facility. In view of various considerations, such as growing global and/or domestic security threats, protecting the safety of the public and the enforcement of applicable statutes and regulations, there may be a need of cost-effective and relatively more robust and consistent screening and identification processes in the context of both international and/or domestic mail or shipment processing facilities. The present inventors have further recognized that presently there is no standardized or globally-accepted techniques for consistently and cost-effectively identifying candidate items for inspection or test of prohibited and/or restricted content.

At least in view of the foregoing recognition, the present inventors disclose system and methodology that make use of artificial intelligence techniques—such as, without limitation, may involve algorithmic approaches, based on prediction, adaptivity and smart algorithms, together with heuristic approaches, machine vision, machine learning, data-intensive and/or sensor-driven tasks—to autonomously screen in real-time each respective item of a stream of mailable or shippable items being conveyed through an item processing system.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

FIG. 1 illustrates a schematic diagram of one non-limiting embodiment of a disclosed computerized system 10, as may be used to autonomously screen in real-time each respective item of a stream of mailable or shippable items being conveyed through an item processing system 12. Non-limiting examples of mailable or shippable items may include envelopes, parcels, mailing tubes, cargo containers and the like.

In one non-limiting embodiment, artificial intelligence-based system 14 may be configured to autonomously screen the mailable or shippable items being conveyed through item processing system 12. Without limitation artificial intelligence-based system 14 may be implemented in the form of one or more processors that may include hardware accelerators suitable for executing in real time algorithms involving machine vision, machine learning, and data-intensive and/or sensor-driven tasks. It will be appreciated that the execution of such algorithms may be performed by such processors using distributed processing techniques.

In one non-limiting embodiment, artificial intelligence-based system 14 is operatively coupled to acquire data indicative of physical characteristics and digital information in connection with each respective item of the stream of mailable or shippable items being conveyed through item processing system 12. One non-limiting example of an item processing system may be a Visicon®-based automated system produced by Siemens Industry Inc., a Siemens business. It will be appreciated that disclosed embodiments are not limited to any particular item processing system since disclosed embodiments may be used in conjunction with any item processing system that, for example, may be used for separating and sorting letters, packages, and other types of mailable or shippable items.

In one non-limiting embodiment, disclosed system 10 acquires and processes respective signals or data from a sensor suite 16 that, without limitation, could be (but need not be) part of item processing system 12 and may be arranged to sense the physical characteristics and digital information in connection with each respective item of the stream of mailable or shippable items being conveyed through item processing system 12.

Figure 2:
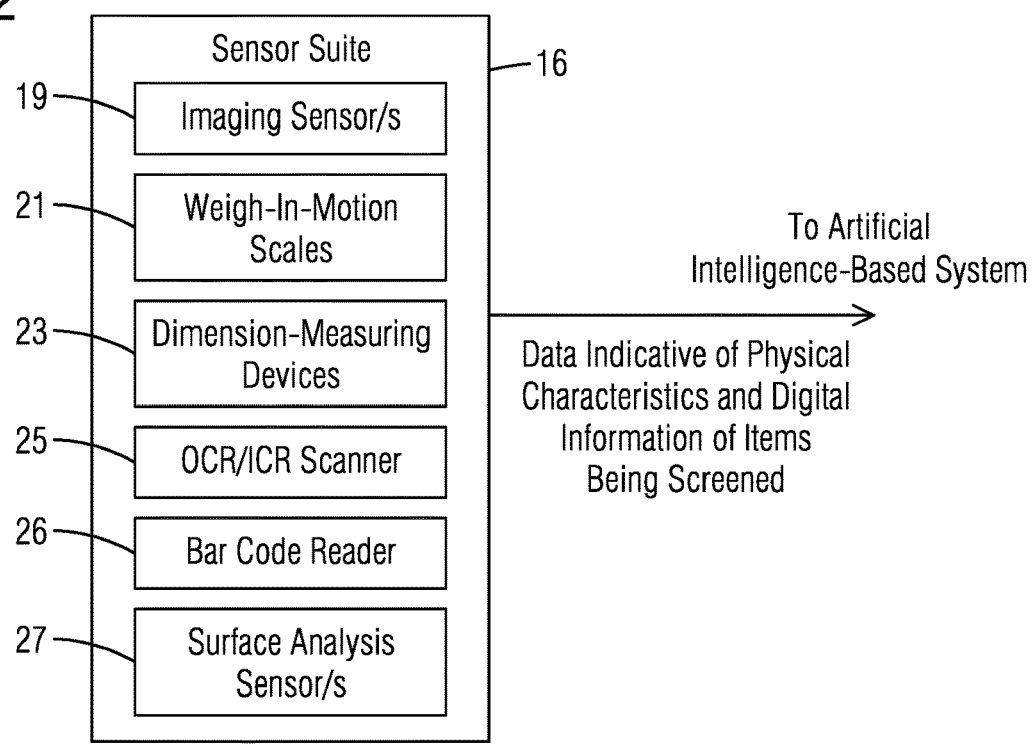
FIG. 2 illustrates a block diagram of a non-limiting example of a sensor suite that may be used by a disclosed system to acquire data indicative of physical characteristics and digital information in connection with each respective item of the stream of mailable or shippable items being conveyed through the item processing system.

In one non-limiting embodiment, sensor suite 16 may include one or more imaging sensors 19 (FIG. 2), such as one or more cameras arranged to capture images providing different views (e.g., images that may be arranged to provide stereo vision) of each respective item of the stream of mailable or shippable items being conveyed through item processing system 12. Non-limiting examples of cameras that may be used may be cameras configured to generate a three-dimensional (3-D) point cloud of a given scene. It will be appreciated that, without limitation, alternatively, one can construct a 3-D image from images captured by multiple standard two-dimensional (2-D) cameras with each camera recording its respective image from a different viewpoint, in conjunction with data from dimensioning sensors capturing dimensioning information from multiple points along all surfaces of the item in order to create an accurate 3-D model. Capturing surface dimension information can be accomplished by various modalities of sensors but is not limited to laser reflection sensors, ultrasonic reflection sensors, etc.

Sensor suite 16 may further include one or more weigh-in-motion scales 21 arranged to measure the respective weight of each respective item of the stream of mailable or shippable items being conveyed through item processing system 12. Additionally, sensor suite 16 may include one or more dimension-measuring devices 23 arranged to measure dimensions of each respective item of the stream of mailable or shippable items being conveyed through item processing system 12. Additionally, sensor suite 16 may include surface analysis sensors 27 for accurately detecting and digitizing surface depth variation along all surfaces of the mailable item.

In one non-limiting embodiment, an image analyzer 30 (FIG. 1) may be operatively coupled to receive the captured images providing different views of each respective item. Without limitation, image analyzer 30 may be configured to determine physical characteristics of edges, perimeters, and surfaces of each respective item of the stream of mailable or shippable items being conveyed through item processing system 12.

Image analyzer 30 may be further configured to extract digital information contained in regions of interest of each respective item of the stream of mailable or shippable items being conveyed through item processing system 12. Without limitation, the regions of interest may contain various forms of sources of the digital information, such as to/from address labels, barcodes, customs label(s), logos, branding, graphics, etc., in connection with each respective item of the stream of mailable or shippable items being conveyed through item processing system 12

Sensor suite 16 may further include one or more scanners 25 or bar code readers 26 (FIG. 2) to acquire digital information in connection with each respective item of the stream of mailable or shippable items being conveyed through item processing system 12. Non-limiting examples of scanners 25 may be optical character recognition (OCR) scanners, intelligent character recognition (ICR) scanners, or a combination of OCR and ICR scanners.

As will be appreciated by those skilled in the art, often, the originating mailer or shipper of respective items may have submitted a manifest data file, such as may comprise a customs manifest, cargo document or a bill of lading, with the shipment of the respective items for use by item processing system 12 and/or by other support functions within a given receiving facility. Without limitation, disclosed system 10 may have access to manifest data records via a suitable data interface to a manifest repository. Without limitation, a barcode label on each respective item, as may be read by bar code reader 26, may be one straightforward technique by which each respective item may be correlated to its respective manifest record.

In one non-limiting embodiment, artificial intelligence-based system 14 is configured to process the data indicative of the physical characteristics and the digital information in connection with each respective item to form, such as by way of a virtual model generator 20, a respective virtual model of each respective item and generate, by way of a feature set generator 22, a unique feature set for each respective item based on the respective virtual model of each respective item.

In one non-limiting embodiment, artificial intelligence-based system 14 is configured to comparatively analyze, by way of a comparative feature set analyzer 24, the unique feature set of each respective item with respect to reference feature sets, as may be stored in a database 40. Based on estimation of a match, or near match of the unique feature set of a respective item of the stream of mailable or shippable items with at least one of the reference feature sets, artificial intelligence-based system 14 is configured to identify the respective item of the stream of mailable or shippable items as a candidate for content inspection and/or testing, such as to check for prohibited and/or restricted content.

In one non-limiting embodiment, artificial intelligence-based system 14 may be configured to command item processing system 12 to divert the respective identified item of the stream of mailable or shippable items for content inspection and/or testing. Results of detection of positive matches of respective unique feature sets of respective items with at least one of the reference feature sets may also be stored in a memory 42 to, for example, generate end-of-run report statistics. The respective unique feature sets that result in positive matches may also be stored in memory 42 for possible subsequent use in tuning of the reference feature sets stored in database 40, such as by way of validation feedback as to whether the inspection or testing of the content of given item candidate actually yielded positive or negative results of prohibited and/or restricted content.

In one non-limiting embodiment, a machine-learning subsystem 50 may be configured to generate the reference feature sets and respective match confidence thresholds for each reference feature set. In certain embodiments, at least some of the reference feature sets and respective match confidence thresholds of the at least some of the reference feature sets may be generated by machine-learning subsystem 50 in response to a training dataset configured to define constituent elements and respective relevance values of the defined constituent elements of the at least some of the reference feature sets. Without limitation, the defined constituent elements and the respective relevance values of each reference feature set being configured to predict items, (e.g., to systematically and accurately divert out from the stream of items being screened potentially suspicious items) which are candidates for content inspection and/or testing.

In one non-limiting embodiment, machine-learning subsystem 50 may be further configured to auto-tune the respective relevance values of at least one or more constituent elements of respective ones of the reference feature sets and/or auto-tune the respective match confidence thresholds of respective ones of the reference feature sets.

In one non-limiting embodiment, machine-learning subsystem 50 may be arranged to populate database 40 to store the reference feature sets and respective match confidence threshold values for each reference feature set. In one non-limiting embodiment, machine-learning subsystem 50 may be responsive to 1) feedback obtained from validation data indicative of detection or misdetection of items identified as candidates for content inspection and/or testing, and/or 2) feedback obtained from test data indicative of items incorrectly missed as candidates for content inspection and/or testing. The idea is to reduce occurrence of false positive errors and false negative errors. As will be appreciated by one skilled in the art, an appropriate balance should be chosen between risks of false negatives and false positives and the system has the flexibility to permit a user to tailor such a balance based on the needs of any given application.

In one non-limiting embodiment, a user interface 60 may be operatively coupled to database 40 to permit entry of a user-defined reference feature set and a respective match confidence threshold for the user-defined reference feature set. Additionally, user interface 60 may be operatively coupled to artificial intelligence-based system 14 to permit entry into database 40 by the user of a user-selected unique feature set of the unique feature sets generated for each respective item by artificial intelligence-based system 14. For example, the user may want to share and disseminate to other users a unique feature set that may be indicative of a newly uncovered security threat.

Figure 3:
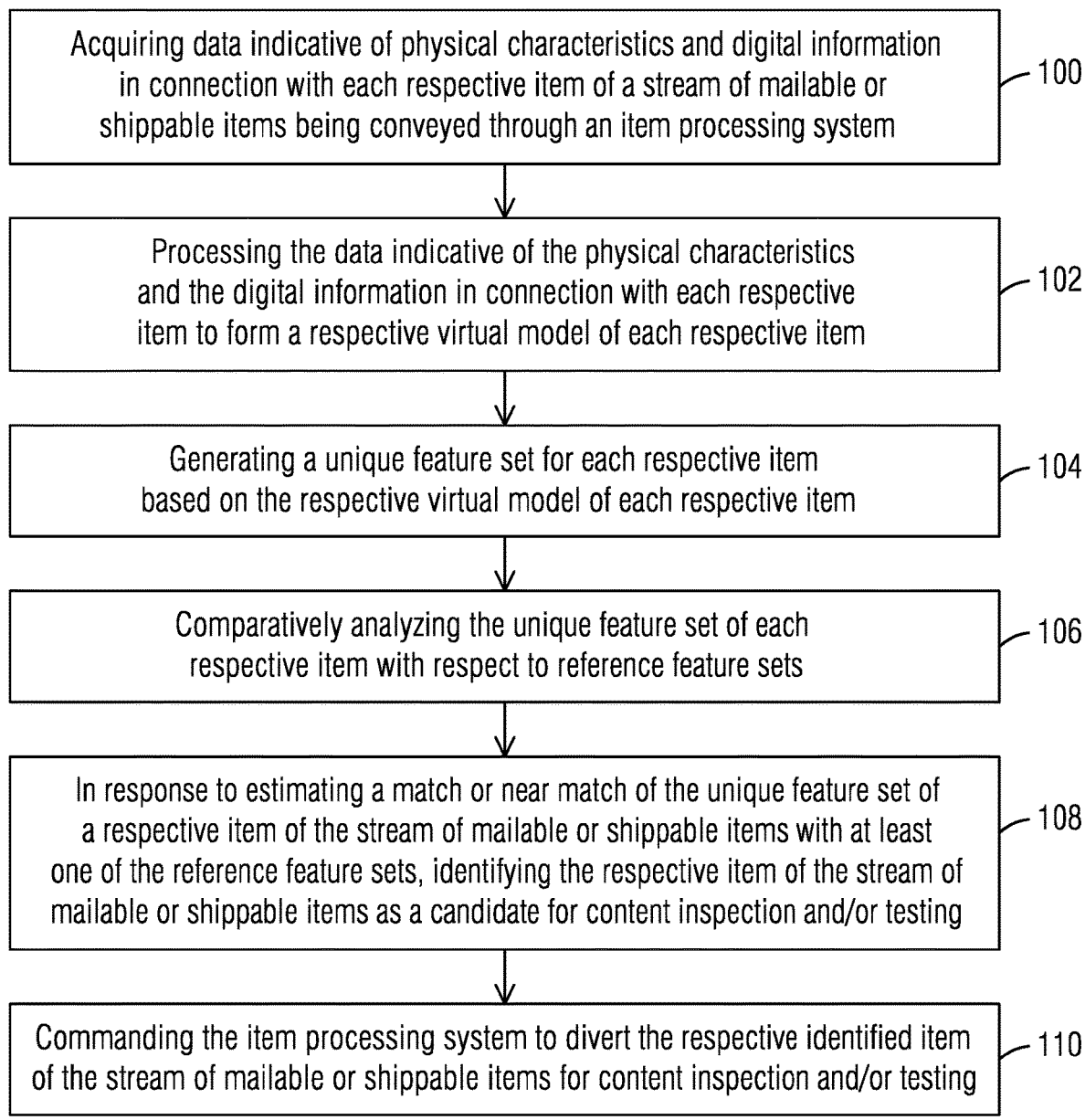
FIGS. 3-5 illustrate respective flowcharts depicting non-limiting embodiments of workflow of actions or acts that may be involved in a disclosed computerized method for autonomously screening in real-time mailable or shippable items being conveyed through an item processing system to identify candidate items for content inspection and/or testing.

FIG. 3 is a flow chart of one non-limiting embodiment of a disclosed computerized method as may be used for carrying out autonomous screening in real-time of mailable or shippable items being conveyed through an item processing system to identify candidate items for content inspection and/or testing.

In one non-limiting embodiment, block 100 indicates an act for acquiring data indicative of physical characteristics and digital information in connection with each respective item of a stream of mailable or shippable items being conveyed through an item processing system. Block 102 indicates an act for processing, e.g., by artificial intelligence-based system 14 (FIG. 1), the data indicative of the physical characteristics and the digital information in connection with each respective item to form a respective virtual model of each respective item. Block 104 indicates an act for generating a unique feature set for each respective item based on the respective virtual model of each respective item. Block 106 indicates an act for comparatively analyzing the unique feature set of each respective item with respect to reference feature sets. In response to estimating a match or near match of the unique feature set of a respective item of the stream of mailable or shippable items with at least one of the reference feature sets, block 108 indicates an act for identifying the respective item of the stream of mailable or shippable items as a candidate for content inspection and/or testing. Block 110 indicates an act for commanding the item processing system to divert the respective identified item of the stream of mailable or shippable items for content inspection and/or testing.

Figure 4:
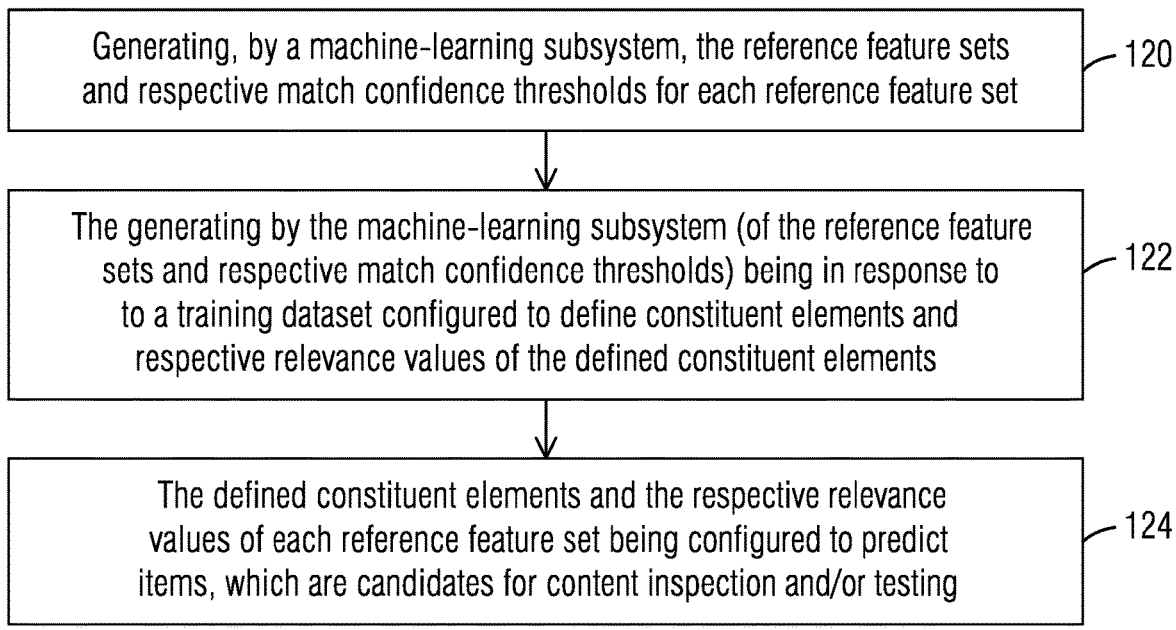

FIG. 4 is a flow chart of machine learning aspects in connection with the disclosed computerized method. In one non-limiting embodiment, block 120 indicates an act for generating, by machine-learning subsystem 50 (FIG. 1), the reference feature sets and respective match confidence thresholds for each reference feature set. Block 122 indicates an act where the generating by machine-learning subsystem 50 of the reference feature sets and respective match confidence thresholds may be in response to a training dataset configured to define constituent elements and respective relevance values of the defined constituent elements. Block 124 indicates an act where the defined constituent elements and the respective relevance values of each reference feature set may be configured to predict items, which are candidates for content inspection and/or testing.

Figure 5:
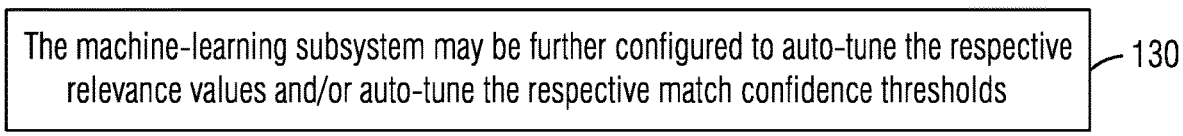

FIG. 5 is a flow chart of further machine learning aspects in connection with the disclosed computerized method. In one non-limiting embodiment, block 130 indicates an act where machine-learning subsystem 50 may be configured to auto-tune the respective relevance values and/or auto-tune the respective match confidence thresholds.

Without limitation, to generate the reference feature sets and respective match confidence thresholds for each reference feature set, the machine-learning subsystem may be responsive to 1) feedback obtained from validation data indicative of detection or misdetection of items identified as candidates for content inspection and/or testing, and/or 2) feedback obtained from test data indicative of items incorrectly missed as candidates for content inspection and/or testing.

Figure 6:
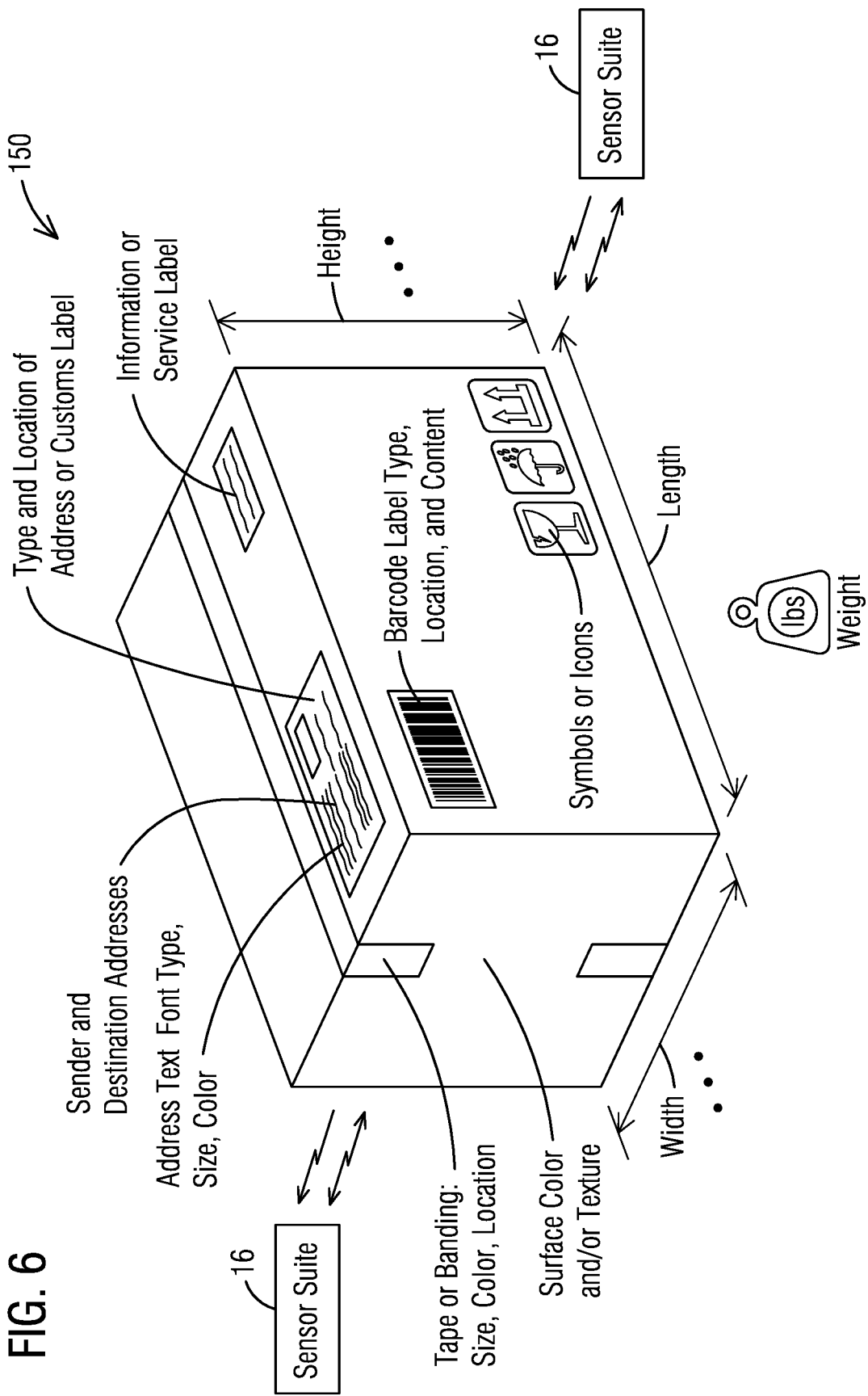
FIG. 6 illustrates one example of a mail parcel including a sensor suite for acquiring data indicative of physical characteristics and digital information that may be used by a disclosed system to generate a unique feature set in connection with the mail parcel.

FIG. 6 illustrates one example of a mail parcel 150 and sensor suite 16 arranged to acquire data indicative of physical characteristics and digital information in connection with mail parcel 150 that may be processed by disclosed system 10 to generate a unique feature set for mail parcel 150. This feature set is effective to screen mail parcel 150, as described above in the context of FIGS. 1-5.

Without limitation, in certain embodiments the architecture of machine-learning subsystem 50 may include convolutional, sub-sampling (e.g., max or average pooling), fully connected layers, recurrent, SoftMax, concatenation, dropout, residual, and/or other types of layers. Any combination of layers may be provided. Any arrangement of layers may be used. Skipping, feedback, or other connections within or between layers may be used. Hierarchical structures may be employed, either for learning features or representation or for classification or regression.

Without limitation, in certain embodiments the architectures for deep learning may include a convolutional neural network (CNN) or convolution layer. The CNN defines one or more layers where each layer has a filter kernel for convolution with the input to the layer. Other convolutional layers may provide further abstraction, such as receiving the output from a previous layer and convolving the output with another filter kernel. For example, the machine learning may identify filter kernels conducive to generation of reference feature sets with superior granularity for detecting item candidates for content inspection and/or testing. It will be appreciated that various types of architectures or corresponding networks may be used, such as generative models or feedforward neural networks. Other types of machine learning and corresponding networks may be used instead of neural networks and deep learning, such as a support vector machine.

Without limitation, in certain embodiments the architecture may include one or more dense layers. The dense layers connect various features from a previous layer to an output from the layer. In certain embodiments, the dense layers may be fully connected layers. One or more fully connected layers may be provided. The dense layers may form a multi-layer perceptron.

Without limitation, in certain embodiments machine-learning subsystem 50 may be trained (e.g., pre-trained or trained from scratch) for any number of epochs using any appropriate optimization technique, learning rate, and/or mean-squared error loss. Other arrangements, layers, units, activation functions, architectures, learning rates, optimizations, loss functions, and/or normalization may be used. It will be appreciated that other architectures may be used in connection with disclosed embodiments.

In one non-limiting embodiment, disclosed system 10, such as including artificial intelligence-based system 14, machine-learning subsystem 50, etc., may be a digital processing system comprising at least one processor (e.g., a microprocessor/CPU). The at least one processor may be configured to carry out various processes and actions described in connection with disclosed embodiments by executing from a memory, computer/processor executable code corresponding to one or more software and/or firmware applications, routines or portions thereof that are programmed to cause the at least one processor to carry out the various processes and actions described in connection with disclosed embodiments. Without limitation, digital processing system could be a local and/or remote system, server, controller. etc. As used herein, a processor corresponds to any electronic device that may be configured via hardware circuits, software, and/or firmware to process data or signals.

As used herein, terms such as "system", "apparatus" and "device" may each encompass hardware, software, or a combination of hardware and software. Thus, for example, a system, apparatus or device may be a process, a process executing on a processor, or a processor. Additionally, a system, apparatus or device may be localized on a single component or distributed across several components.

It is noted that while the disclosure in connection with disclosed embodiments includes a description in the context of a fully functional system and/or respective sequences of acts or actions, those skilled in the art will appreciate that at least portions of the structural and/or operational relationships of disclosed embodiments and/or described actions are capable of being in the form of computer/processor executable code (e.g., software and/or firmware code or programmable instructions) contained within a data store that corresponds to a non-transitory machine-usable, computer-usable, or computer-readable medium in any of a variety of forms (e.g., without limitation, flash drive, SSD, hard drive, ROM, EPROMs, optical discs/drives, databases, etc.). The computer/processor executable code may include a routine, a sub-routine, programs, applications, modules, libraries, and/or the like. Further, it should be appreciated that computer/processor executable code may correspond to and/or may be generated from source code, byte code, runtime code, machine code, assembly language, such as Java, JavaScript, Python, *Julia*, C, C#, C++ or any other form of code that can be programmed/configured to cause at least one processor to carry out the actions and features described herein.

In operation, disclosed embodiments are effective to automate a process for accurately and consistently identifying candidate items for content inspection or test, such as based on similarities to items previously confirmed to contain prohibited and/or restricted content.

In operation, disclosed embodiments can substantially expand a range of characteristics and features that may be considered as relevant for detection of candidate items compared to, for example, manual screening of a passing stream of mail pieces. It should be appreciated that systematically and accurately assessing data indicative of physical characteristics and digital information, such as a profile of the items being screened based, for example, on dimensions, weight and other physical characteristics of the items; and extracted digital information, such as sender's name/address, recipients name/address, and other digital information is just not feasible in such a manual screening process.

In operation, disclosed embodiments can benefit from machine learning and/or deep-learning techniques (e.g., including automated tuning) of the reference feature sets based on test and inspection results to, for example, increase accuracy of detection rate and reduce occurrences of false positives and false negatives.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A computerized system comprising:
an artificial intelligence-based system configured to autonomously screen in real-time each respective item of a stream of mailable or shippable items being conveyed through an item processing system,
wherein the artificial intelligence-based system is operatively coupled to acquire sensor data indicative of physical characteristics and digital information in connection with each respective item of the stream of mailable or shippable items being conveyed through the item processing system,
wherein the artificial intelligence-based system is configured to process the data indicative of the physical characteristics and the digital information in connection with each respective item to form a respective virtual model of each respective item and generate a unique feature set for each respective item based on the respective virtual model of each respective item;
wherein the artificial intelligence-based system is configured to comparatively analyze the unique feature set of each respective item with respect to reference feature sets;
based on estimation of a match or near match of the unique feature set of a respective item of the stream of mailable or shippable items with at least one of the reference feature sets, the artificial intelligence-based system configured to identify the respective item of the stream of mailable or shippable items as a candidate for content inspection or testing;
the artificial intelligence-based system configured to command the item processing system to divert the respective identified item of the stream of mailable or shippable items for content inspection or testing,
the computerized system further comprising a machine-learning subsystem configured to generate the reference feature sets and respective match confidence thresholds for each reference feature set, wherein at least some of the reference feature sets and respective match confidence thresholds of the at least some of the reference feature sets are generated by the machine-learning subsystem in response to a training dataset configured to define constituent elements and respective relevance values of the defined constituent elements of the at least some of the reference feature sets, the defined constituent elements and the respective relevance values of each reference feature set being configured to predict items, which are candidates for content inspection or testing.

2. The computerized system of claim 1, wherein the stream of mailable or shippable items is selected from the group consisting of envelopes, parcels and cargo containers.

3. The computerized system of claim 1, wherein the machine-learning subsystem is further configured to auto-tune the respective relevance values of at least one or more constituent elements of respective ones of the reference feature sets or auto-tune the respective match confidence thresholds of respective ones of the reference feature sets.

4. The computerized system of claim 3, wherein the machine-learning subsystem is arranged to populate a database arranged to store the reference feature sets and respective match confidence threshold values for each reference feature set.

5. The computerized system of claim 4, further comprising a user interface operatively coupled to the database to permit entry of a user-defined reference feature set and a respective match confidence threshold for the user-defined reference feature set.

6. The computerized system of claim 5, wherein the user interface is operatively coupled to the artificial intelligence-based system to permit entry into the database by the user of a user-selected unique feature set of the unique feature sets generated for each respective item by the artificial intelligence-based system.

7. The computerized system of claim 3, wherein the machine-learning subsystem is responsive to 1) feedback obtained from validation data indicative of detection or misdetection of items identified as candidates for content inspection or testing, or 2) feedback obtained from test data indicative of items incorrectly missed as candidates for content inspection or testing.

8. The computerized system of claim 1, further comprising a suite of sensors arranged to sense the physical characteristics of each respective item of the stream of mailable or shippable items being conveyed through the item processing system.

9. The computerized system of claim 8, wherein the suite of sensors comprises one or more imaging sensors arranged to capture images providing different views of each respective item of the stream of stream of mailable or shippable items being conveyed through the item processing system.

10. The computerized system of claim 9, wherein the suite of sensors further comprises one or more weigh-in-motion scales arranged to measure weight of each respective item of the stream of mailable or shippable items being conveyed through the item processing system.

11. The computerized system of claim 10, wherein the suite of sensors further comprises one or more dimension-measuring devices arranged to measure dimensions of each respective item of the stream of mailable or shippable items being conveyed through the item processing system.

12. The computerized system of claim 11, wherein the suite of sensors further comprises one or more surface analysis sensors arranged to measure surface depth variation of respective surfaces of each respective item of the stream of mailable or shippable items being conveyed through the item processing system.

13. The computerized system of claim 9, further comprising an image analyzer operatively coupled to receive the captured images providing different views of each respective item, the image analyzer configured to determine physical characteristics of edges, perimeters, and surfaces of each respective item of the stream of mailable or shippable items being conveyed through the item processing system.

14. The computerized system of claim 13, wherein the image analyzer is further configured to extract digital information contained in regions of interest of each respective item of the stream of mailable or shippable items being conveyed through the item processing system.

15. The computerized system of claim 9, wherein the suite of sensors further comprises one or more scanners selected from the group consisting of an optical character recognition (OCR) scanner, an intelligent character recognition (ICR) scanner, and a combination of two or more of said OCR and ICR scanners.

16. The computerized system of claim 15, wherein the optical character recognition (OCR) scanner, the intelligent character recognition (ICR) scanner, or the combination of two or more of said OCR and ICR scanners is each respectively coupled to the one or more imaging sensors to scan the captured images.

17. A computerized method comprising:
acquiring sensor data indicative of physical characteristics and digital information in connection with each respective item of a stream of mailable or shippable items being conveyed through an item processing system,
processing, by an artificial intelligence-based system, the data indicative of the physical characteristics and the digital information in connection with each respective item to form a respective virtual model of each respective item;
generating, by the artificial intelligence-based system, a unique feature set for each respective item based on the respective virtual model of each respective item;
comparatively analyzing, by the artificial intelligence-based system, the unique feature set of each respective item with respect to reference feature sets;
in response to estimating a match or near match by the artificial intelligence-based system of the unique feature set of a respective item of the stream of mailable or shippable items with at least one of the reference feature sets, identifying the respective item of the stream of mailable or shippable items as a candidate for content inspection or testing;
commanding the item processing system to divert the respective identified item of the stream of mailable or shippable items for content inspection or testing; and
generating, by a machine-learning subsystem, the reference feature sets and respective match confidence thresholds for each reference feature set, wherein the generating by the machine-learning subsystem of at least some of the reference feature sets and respective match confidence thresholds of the at least some of the reference feature sets being in response to a training dataset configured to define constituent elements and respective relevance values of the defined constituent elements of the at least some of the reference feature sets, the defined constituent elements and the respective relevance values of each reference feature set being configured to predict items, which are candidates for content inspection or testing.

\* \* \* \* \*